(12) United States Patent
Sakamaki

(10) Patent No.: US 8,783,408 B2
(45) Date of Patent: Jul. 22, 2014

(54) HYDRAULIC POWER STEERING SYSTEM

(75) Inventor: Masahiko Sakamaki, Yao (JP)

(73) Assignee: JTEKT Corporation, Osaka (JP)

( * ) Notice: Subject to any disclaimer, the term of this patent is extended or adjusted under 35 U.S.C. 154(b) by 8 days.

(21) Appl. No.: 13/551,201

(22) Filed: Jul. 17, 2012

(65) Prior Publication Data

US 2013/0037341 A1 Feb. 14, 2013

(30) Foreign Application Priority Data

Aug. 9, 2011 (JP) ................................ 2011-173959

(51) Int. Cl.
*B62D 5/06* (2006.01)

(52) U.S. Cl.
USPC ........................... 180/421; 180/417; 180/422

(58) Field of Classification Search
USPC ......................................... 180/421, 417, 422
See application file for complete search history.

(56) References Cited

U.S. PATENT DOCUMENTS

| 6,279,675 | B1 * | 8/2001 | Bohner et al. | 180/403 |
| 6,612,393 | B2 * | 9/2003 | Bohner et al. | 180/405 |
| 7,617,906 | B2 * | 11/2009 | Williams | 180/422 |
| 7,648,003 | B2 * | 1/2010 | Miyajima et al. | 180/422 |
| 8,224,530 | B2 * | 7/2012 | Montosi et al. | 701/42 |
| 2004/0188169 | A1 * | 9/2004 | Williams et al. | 180/421 |
| 2006/0175118 | A1 * | 8/2006 | Hirakushi et al. | 180/422 |
| 2012/0247864 | A1 * | 10/2012 | Kubo et al. | 180/422 |

FOREIGN PATENT DOCUMENTS

| JP | A-09-263256 | 10/1997 |
| JP | A-2007-253829 | 10/2007 |

OTHER PUBLICATIONS

Mar. 27, 2014 Search Report issued in European Patent Application No. 12177414.5.

* cited by examiner

*Primary Examiner* — Kevin Hurley
*Assistant Examiner* — Michael Stabley
(74) *Attorney, Agent, or Firm* — Oliff PLC

(57) ABSTRACT

A pump rotation speed correcting unit includes a valve opening degree command differential value computing unit, a pump rotation speed correction value computing unit, and a correction value adding unit. The valve opening degree command differential value computing unit computes a temporal differential value of a valve opening degree command value that is set by a valve opening degree command value setting unit. The pump rotation speed correction value computing unit computes a correction value of a pump rotation speed command value on the basis of the valve opening degree command differential value. The correction value adding unit adds the pump rotation speed correction value to the pump rotation speed command value that is set by the pump rotation speed command value setting unit.

2 Claims, 4 Drawing Sheets

HYDRAULIC POWER STEERING SYSTEM

INCORPORATION BY REFERENCE/RELATED APPLICATION

This application claims priority to Japanese Patent Application No. 2011-173959 filed on Aug. 9, 2011 the disclosure of which, including the specification, drawings and abstract, is incorporated herein by reference in its entirety.

BACKGROUND OF THE INVENTION

1. Field of the Invention

The invention relates to a hydraulic power steering system.

2. Discussion of Background

Japanese Patent Application Publication No. 2007-253829 (JP 2007-253829 A) describes a hydraulic power steering system that assists a steering operation by supplying hydraulic fluid from a hydraulic pump to a power cylinder, which is coupled to a steering mechanism of a vehicle, via a hydraulic control valve. In such a hydraulic power steering system, the hydraulic control valve is mechanically coupled to a steering member, such as a steering wheel, via a steering shaft, and the opening degree of the hydraulic control valve is adjusted in response to an operation of the steering member.

Japanese Patent Application Publication No. 9-263256 (JP 9-263256 A) describes a hydraulic power steering system in which a hydraulic control valve is not mechanically coupled to a steering member and the opening degree of the hydraulic control valve is controlled by an electric motor (valve driving motor). In such a hydraulic power steering system, an opening degree command value for the hydraulic control valve is computed on the basis of, for example, a steering torque and a vehicle speed, and drive control over the valve driving motor is executed on the basis of the opening degree command value. Note that an electric motor (pump driving motor) for driving a hydraulic pump is controlled on the basis of a pump rotation speed command value computed from a steering angular velocity (rotation speed feedback control).

In the hydraulic power steering system in which the opening degree of the hydraulic control valve is controlled by the valve driving motor, the steering member is not mechanically coupled to the hydraulic control valve. Therefore, the following problem may occur. That is, when the pressure of hydraulic fluid is decreased due to an abrupt change in the opening degree of the hydraulic control valve, a load of the hydraulic pump decreases and, as a result, the hydraulic pump attempts to increase its rotation speed. However, because the pump driving motor is subjected to rotation speed feedback control, the rotation speed of the hydraulic pump does not increase. Consequently, the amount of hydraulic fluid that is supplied to a power cylinder decreases.

SUMMARY OF THE INVENTION

The invention provides a hydraulic power steering system that is able to suppress a decrease in the amount of hydraulic fluid that is supplied to a power cylinder when the pressure of hydraulic fluid is decreased due to an abrupt change in the opening degree of a hydraulic pressure control valve.

According to a feature of an example of the invention, when an opening degree of a hydraulic control valve abruptly changes and a pressure of hydraulic fluid decreases, it is possible to make a correction such that a rotation speed command value that is set by rotation speed command value setting means increases. Therefore, it is possible to suppress a decrease in the amount of hydraulic fluid that is supplied to a power cylinder.

According to another feature of an example of the invention, when an opening degree of a hydraulic control valve abruptly changes and a pressure of hydraulic fluid increases, a correction is made such that a rotation speed command value that is set by rotation speed command value setting means decreases. Therefore, it is possible to suppress an increase in the amount of hydraulic fluid that is supplied to the power cylinder.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
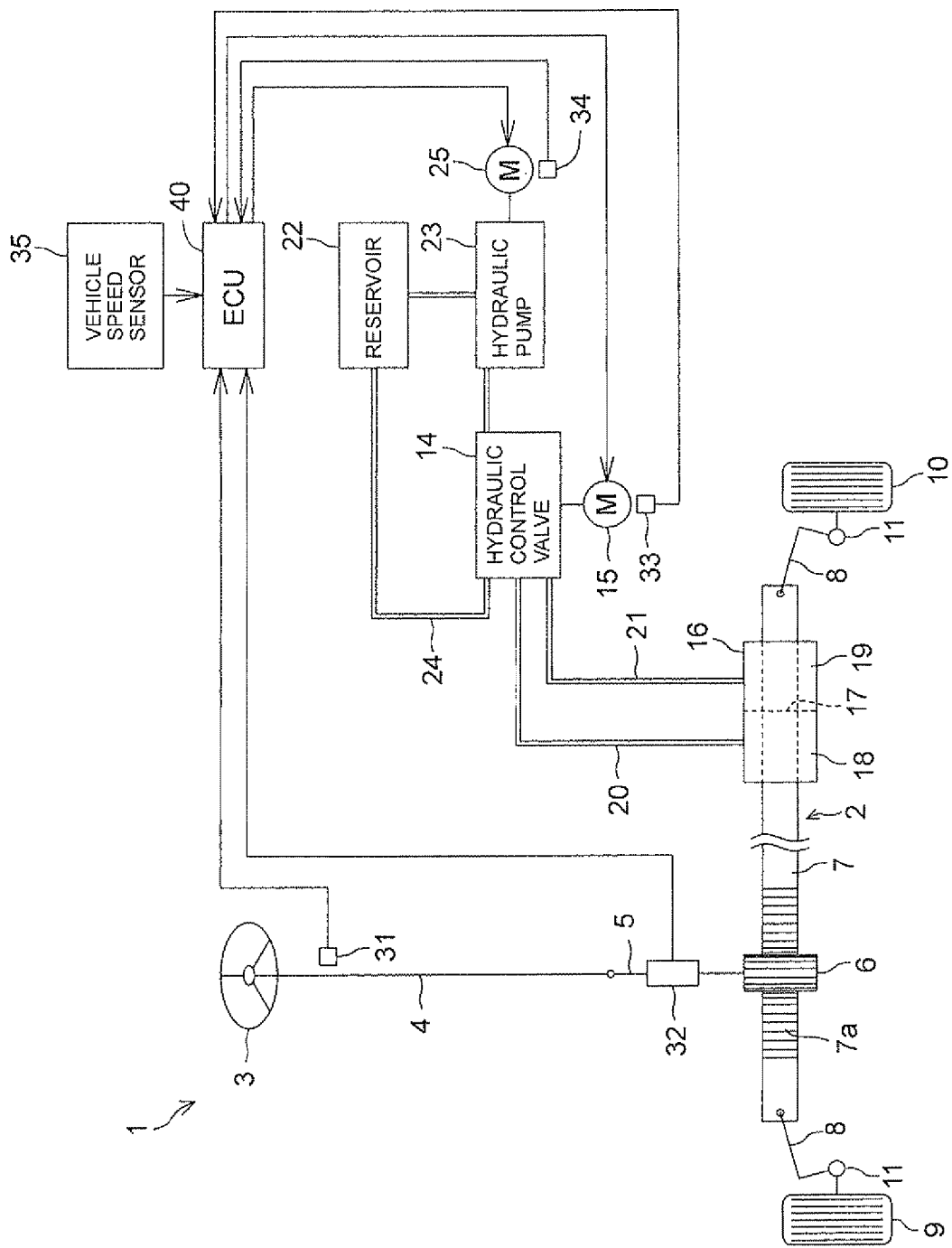
FIG. 1 is a schematic view that shows the schematic configuration of a hydraulic power steering system according to an embodiment of the invention.

FIG. 1 is a schematic view that shows the schematic configuration of a hydraulic power steering system according to an embodiment of the invention. A hydraulic power steering system 1 is used to apply steering assist force to a steering mechanism 2 of a vehicle. The steering mechanism 2 includes a steering wheel 3, a steering shaft 4, a pinion shaft 5, and a rack shaft 7. The steering wheel 3 may function as a steering member, and is operated by a driver. The steering shaft 4 is coupled to the steering wheel 3. The pinion shaft 5 is coupled to the distal end portion of the steering shaft 4, and has a pinion gear 6. The rack shaft 7 has a rack 7a that is in mesh with the pinion gear 6, and that serves as a steered shaft that extends in the lateral direction of the vehicle.

Tie rods 8 are coupled to respective ends of the rack shaft 7. The tie rods 8 are coupled to respective knuckle arms 11 that support left and right steered wheels 9, 10. When the steering shaft 4 is rotated in response to an operation of the steering wheel 3, the rotation is converted into linear motion in the axial direction of the rack shaft 7 by the pinion gear 6 and the rack 7a.

A steering angle sensor 31 is provided around the steering shaft 4. The steering angle sensor 31 is used to detect a steering angle θh that is a rotation angle of the steering shaft 4. In the present embodiment, the steering angle sensor 31 is used to detect a rotation amount (rotation angle) of the steering shaft 4 in a forward direction and a reverse direction from a neutral position of the steering shaft 4. The steering angle sensor 31 outputs a clockwise rotation amount from the neutral position as a positive value, and outputs a counterclockwise rotation amount from the neutral position as a negative value. A torque sensor 32 is provided on the pinion shaft 5. The torque sensor 32 is used to detect a steering torque Th.

The hydraulic power steering system 1 includes a hydraulic control valve 14, a power cylinder 16, and a hydraulic pump 23. The hydraulic control valve 14 is a rotary valve, and includes a rotor housing (not shown) and a rotor (not shown) for changing a direction in which hydraulic fluid flows. The opening degree of the hydraulic control valve 14 is controlled by rotating the rotor of the hydraulic control valve 14 with the use of an electric motor 15 (hereinafter, referred to as "valve driving motor 15"). The valve driving motor 15 is formed of a three-phase brushless motor. A rotation angle sensor 33 is arranged near the valve driving motor 15. The rotation angle sensor 33 is used to detect a rotation angle θB of the rotor of the valve driving motor 15.

The hydraulic control valve 14 is connected to the power cylinder 16 that applies steering assist force to the steering mechanism 2. The power cylinder 16 is coupled to the steering mechanism 2. Specifically, the power cylinder 16 has a piston 17 and a pair of cylinder chambers 18, 19. The piston 17 is securely fitted to the rack shaft 7. The cylinder chambers 18, 19 are defined by the piston 17. The cylinder chambers 18, 19 are connected to the hydraulic control valve 14 via fluid passages 20, 21, respectively.

The hydraulic control valve 14 is arranged in an intermediate portion of a fluid circulation passage 24. The fluid circulation passage 24 passes through a reservoir 22 and the hydraulic pump 23 that is used to generate steering assist force. The hydraulic pump 23 is formed of a gear pump. The hydraulic pump 23 is driven by an electric motor 25 (hereinafter, referred to as "pump driving motor 25") to pump hydraulic fluid stored in the reservoir 22 and supply the hydraulic fluid to the hydraulic control valve 14. Excess hydraulic fluid is returned from the hydraulic control valve 14 to the reservoir 22 via the fluid circulation passage 24.

The pump driving motor 25 is driven to rotate in one direction to thereby drive the hydraulic pump 23. Specifically, the output shaft of the pump driving motor 25 is coupled to the input shaft of the hydraulic pump 23. When the output shaft of the pump driving motor 25 rotates, the input shaft of the hydraulic pump 23 rotates and the hydraulic pump 23 is driven. The pump driving motor 25 is formed of a three-phase brushless motor. A rotation angle sensor 34 is arranged near the pump driving motor 25. The rotation angle sensor 34 is used to detect a rotation angle OP of the rotor of the pump driving motor 25.

When the rotor of the hydraulic control valve 14 is rotated by the valve driving motor 15 in one direction from a reference rotation angular position (neutral position, the hydraulic control valve 14 supplies hydraulic fluid to one of the cylinder chambers 18, 19 of the power cylinder 16 via a corresponding one of the fluid passages 20, 21, and returns hydraulic fluid in the other one of the cylinder chambers 18, 19 to the reservoir 22. In addition, when the rotor of the hydraulic control valve 14 is rotated by the valve driving motor 15 in the other direction from the neutral position, the hydraulic control valve 14 supplies hydraulic pressure to the other one of the cylinder chambers 18, 19 via the other one of the fluid passages 20, 21, and returns hydraulic fluid in the one of the cylinder chambers 18, 19 to the reservoir 22.

When the rotor of the hydraulic control valve 14 is placed at the neutral position, the hydraulic control valve 14 is in a so-called balanced state. Therefore, steering is neutral, the cylinder chambers 18, 19 of the power cylinder 16 are kept at an equal pressure, and hydraulic fluid circulates through the fluid circulation passage 24. When the rotor of the hydraulic control valve 14 is rotated by the valve driving motor 15, hydraulic fluid is supplied to one of the cylinder chambers 18, 19 of the power cylinder 16, and the piston 17 moves in the lateral direction of the vehicle. As a result, steering assist force acts on the rack shaft 7.

The valve driving motor 15 and the pump driving motor 25 are controlled by an electronic control unit (ECU) 40. The steering angle θh detected by the steering angle sensor 31, the steering torque Th detected by the torque sensor 32, a signal output from the rotation angle sensor 33, a signal output from the rotation angle sensor 34, a vehicle speed V detected by a vehicle speed sensor 35, a signal output from a current sensor 36 (see FIG. 2) for detecting a current flowing through the valve driving motor 15, and the like, are input into the ECU 40.

Figure 2:
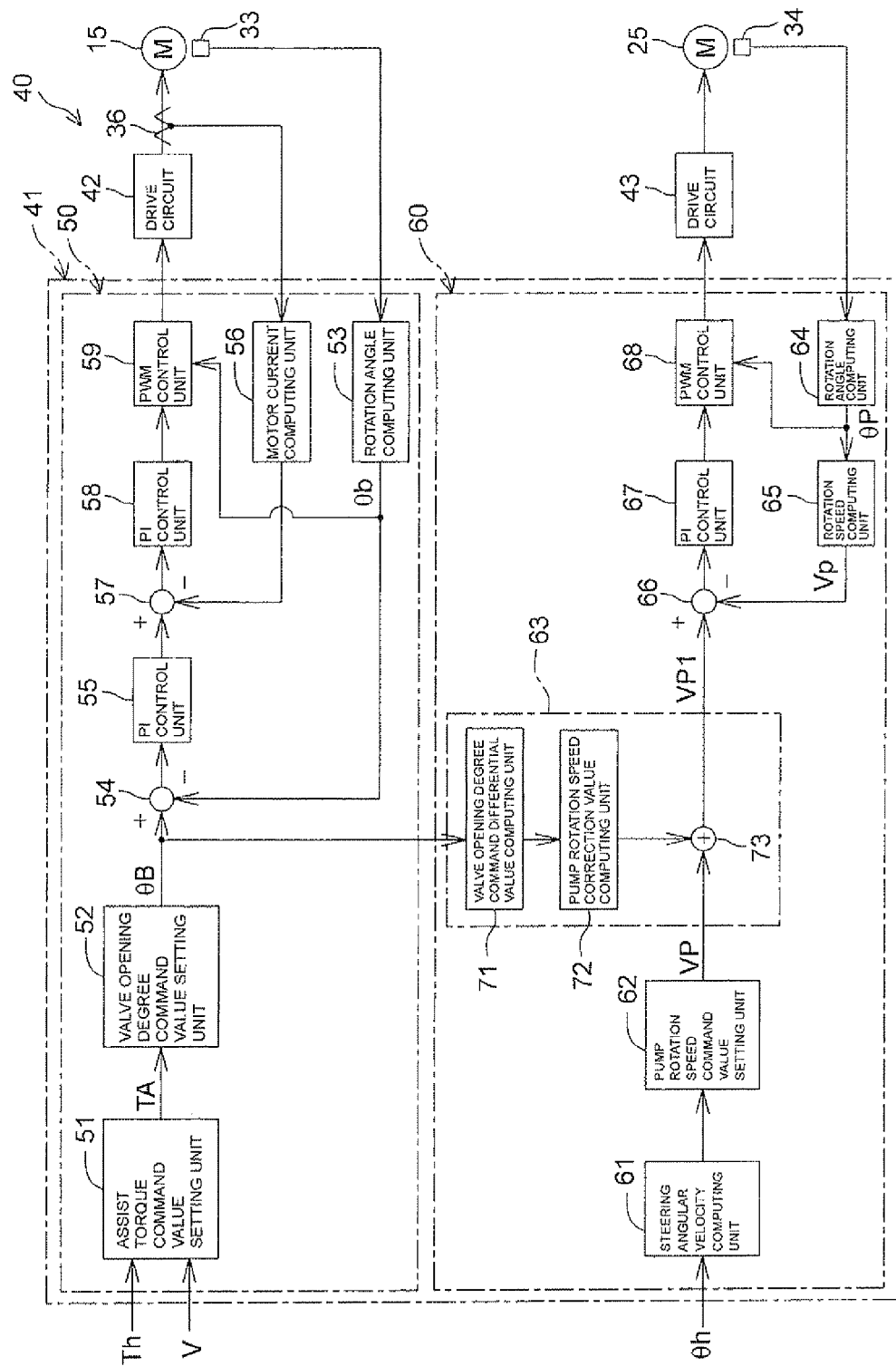
FIG. 2 is a block diagram that shows the electrical configuration of an electronic control unit (ECU)

FIG. 2 is a block diagram that shows the electrical configuration of the ECU 40. The ECU 40 includes a microcomputer 41, a drive circuit (inverter circuit) 42, and a drive circuit (inverter circuit) 43. The drive circuit 42 is controlled by the microcomputer 41, and supplies electric power to the valve driving motor 15. The drive circuit 43 is controlled by the microcomputer 41, and supplies electric power to the pump driving motor 25.

The microcomputer 41 includes a CPU and memories (a ROM, a RAM, and the like), and executes predetermined programs to function as a plurality of functional processing units. The functional processing units include a valve driving motor control unit 50 for controlling the valve driving motor 15 and a pump driving motor control unit 60 for controlling the pump driving motor 25.

The valve driving motor control unit 50 includes an assist torque command value setting unit 51, a valve opening degree command value setting unit 52, a rotation angle computing unit 53, an angular deviation computing unit 54, a PI control unit 55, a motor current computing unit 56, a current deviation computing unit 57, a PI control unit 58, and a PWM control unit 59. The assist torque command value setting unit 51 sets an assist torque command value TA on the basis of the detected steering torque Th detected by the torque sensor 32 and the vehicle speed V detected by the vehicle speed sensor 35. The assist torque command value TA is a command value of assist torque that should be generated by the power cylinder 16.

Figure 3:
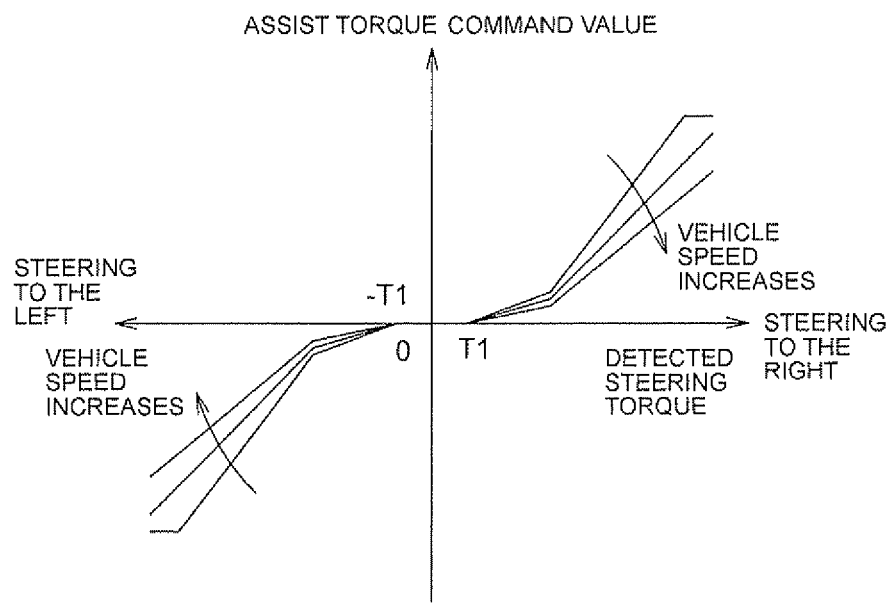
FIG. 3 is a graph that shows the relation of an assist torque command value with respect to a detected steering torque.

Specifically, the assist torque command value setting unit 51 sets the assist torque command value TA on the basis of a map that stores the relation between the detected steering torque and the assist torque command value for each vehicle speed. FIG. 3 is a graph that shows an example of setting of the assist torque command value with respect to the detected steering torque. The detected steering torque Th is set such that torque for steering to the right is a positive value and torque for steering to the left is a negative value. In addition, the assist torque command value TA is a positive value when assist torque for steering to the right is generated by the power cylinder 16, and is a negative value when assist torque for steering to the left is generated by the power cylinder 16.

The assist torque command value TA takes a positive value with respect to a positive value of the detected steering torque Th, and takes a negative value with respect to a negative value of the detected steering torque Th. When the detected steering torque Th is a small value within a range from −T1 to T1, assist torque is set to zero. When the detected steering torque Th falls outside the range from −T1 to T1, the assist torque command value TA is set such that the absolute value of the assist torque command value TA increases as the absolute value of the detected steering torque Th increases. In addition, the assist torque command value TA is set such that the absolute value of the assist torque command value TA decreases as the vehicle speed V detected by the vehicle speed sensor 35 increases.

The valve opening degree command value setting unit 52 sets the valve opening degree command value (motor rotation angle command value) θB on the basis of the assist torque command value TA set by the assist torque command value setting unit 51. The valve opening degree command value θB is a command value of the opening degree of the hydraulic control valve 14 (command value of the rotation angle of the valve driving motor 15). In the present embodiment, the rotation angle of the valve driving motor 15 when the rotor of the hydraulic control valve 14 is placed at the neutral position is zero degrees. When the rotation angle of the valve driving motor 15 becomes larger than zero degrees, the opening degree of the hydraulic control valve 14 is controlled so that assist torque for steering to the right is generated by the power cylinder 16. On the other hand, when the rotation angle of the valve driving motor 15 becomes smaller than zero degrees, the opening degree of the hydraulic control valve 14 is controlled so that assist torque for steering to the left is generated by the power cylinder 16. Note that, as the absolute value of the rotation angle of the valve driving motor 15 increases, the absolute value of assist torque generated by the power cylinder 16 increases.

Figure 4:
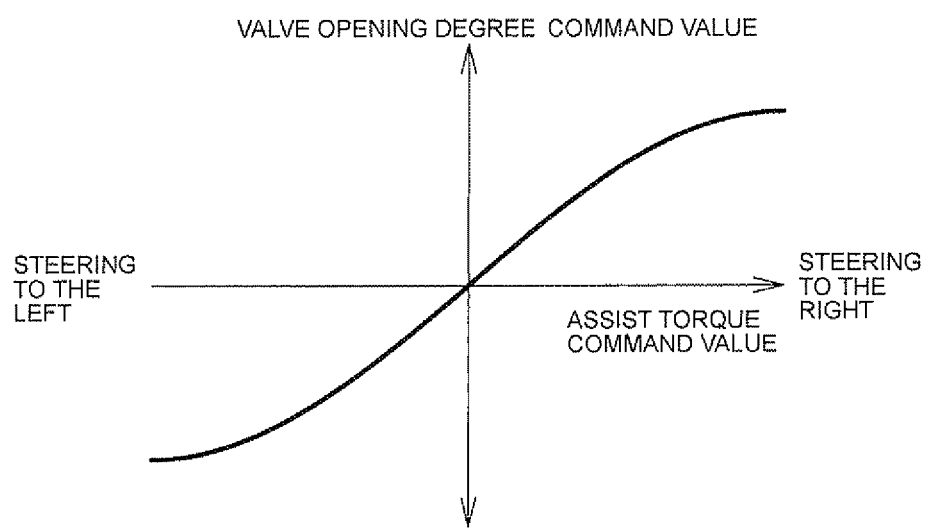
FIG. 4 is a graph that shows the relation of a valve opening degree command value with respect to the assist torque command value.

The valve opening degree command value setting unit 52 sets the valve opening degree command value θB on the basis of a map that stores the relation between the assist torque command value TA and the valve opening degree command value θB. FIG. 4 is a graph that shows the relation of the valve opening degree command value θB with respect to the assist torque command value TA. The valve opening degree command value θB takes a positive value with respect to a positive value of the assist torque command value TA, and takes a negative value with respect to a negative value of the assist torque command value TA. The valve opening degree command value θB is set such that the absolute value of the valve opening degree command value θB increases as the absolute value of the assist torque command value TA increases.

The rotation angle computing unit 53 computes a rotation angle θb of the valve driving motor 15 on the basis of a signal output from the rotation angle sensor 33. The rotation angular deviation computing unit 54 computes a deviation ΔθB (=θB−θb) between the valve opening degree command value θB that is set by the valve opening degree command value setting unit 52 and the rotation angle θb of the valve driving motor 15 that is computed by the rotation angle computing unit 53. The PI control unit 55 carries out PI computation over the rotation angular deviation ΔθB that is computed by the rotation angular deviation computing unit 54. That is, the rotation angular deviation computing unit 54 and the PI control unit 55 constitute rotation angle feedback control means for bringing the rotation angle θb of the valve driving motor 15 to the valve opening degree command value θB. The PI control unit 55 carries out PI computation over the rotation angular deviation ΔθB to compute a current command value for the valve driving motor 15.

The motor current computing unit 56 detects a motor current flowing through the valve driving motor 15 on the basis of a signal output from the current sensor 36. The current deviation computing unit 57 computes a deviation between the current command value that is obtained by the PI control unit 55 and the motor current that is computed by the motor current computing unit 56. The PI control unit 58 carries out PI computation over the current deviation that is computed by the current deviation computing unit 57. That is, the current deviation computing unit 57 and the PI control unit 58 constitute current feedback control means for bringing the motor current flowing through the valve driving motor 15 to the current command value. The PI control unit 58 carries out PI computation over the current deviation to compute a control voltage value that should be applied to the valve driving motor 15.

The PWM control unit 59 generates a drive signal on the basis of the control voltage value that is computed by the PI control unit 58 and the rotation angle θb of the valve driving motor 15, which is computed by the rotation angle computing unit 53, and supplies the drive signal to the drive circuit 42. In this way, a voltage corresponding to the control voltage value that is computed by the PI control unit 58 is applied from the drive circuit 42 to the valve driving motor 15. The pump driving motor control unit 60 includes a steering angular velocity computing unit 61, a pump rotation speed command value setting unit 62, a pump rotation speed correcting unit 63, a rotation angle computing unit 64, a rotation speed computing unit 65, a rotation speed deviation computing unit 66, a PI control unit 67, and a PWM control unit 68.

The steering angular velocity computing unit 61 temporally differentiates a value output from the steering angle sensor 31 to compute a steering angular velocity. The pump rotation speed command value setting unit 62 sets a pump rotation speed command value (motor rotation speed command value) VP that is a command value of the rotation speed (number of revolutions) of the hydraulic pump 23 (a command value of the rotation speed of the pump driving motor 25) on the basis of the steering angular velocity that is computed by the steering angular velocity computing unit 61.

Figure 5:
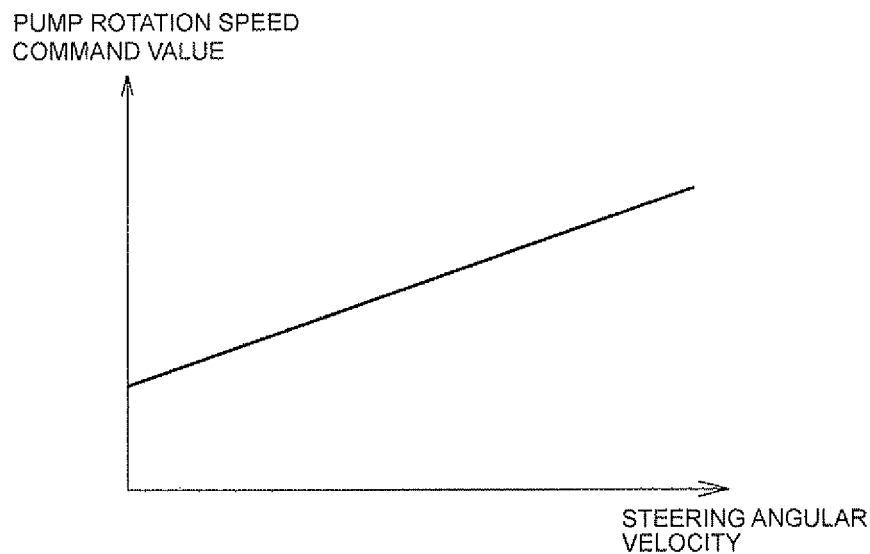
FIG. 5 is a graph that shows the relation of a pump rotation speed command value with respect to a steering angular velocity.

Specifically, the pump rotation speed command value setting unit 62 sets the pump rotation speed command value VP on the basis of a map that stores the relation between the steering angular velocity and the pump rotation speed command value VP. FIG. 5 is a graph that shows an example of setting of the pump rotation speed command value VP with respect to the steering angular velocity. The pump rotation speed command value VP is set such that the pump rotation speed command value VP takes a predetermined lower limit value when the steering angular velocity is zero and the pump rotation speed command value VP is directly proportional to the steering angular velocity.

The pump rotation speed correcting unit 63 is used to correct the pump rotation speed command value VP, which is set by the pump rotation speed command value setting unit 62, on the basis of the valve opening degree command value θB that is set by the valve opening degree command value setting unit 52 in the valve driving motor control unit 50. The details of the pump rotation speed correcting unit 63 will be described later. The rotation angle computing unit 64 computes a rotation angle θP of the pump driving motor 25 on the basis of a signal output from the rotation angle sensor 34. The rotation speed computing unit 65 computes a rotation speed (number of revolutions) Vp of the pump driving motor 25 on the basis of the rotation angle θP of the pump driving motor 25, which is computed by the rotation angle computing unit 64. The rotation speed deviation computing unit 66 computes a deviation ΔVP (=VP1−Vp) between the pump rotation speed command value VP1 that is obtained through correction by the pump rotation speed correcting unit 63 and the rotation speed Vp of the pump driving motor 25, which is computed by the rotation speed computing unit 65.

The PI control unit 67 carries out PI computation over the rotation speed deviation ΔVP that is computed by the rotation speed deviation computing unit 66. That is, the rotation speed deviation computing unit 66 and the PI control unit 67 constitute rotation speed feedback control means for bringing the rotation speed Vp of the pump driving motor 25 to the corrected pump rotation speed command value VP1. The PI control unit 67 carries out PI computation over the rotation speed deviation ΔVP to thereby compute a control voltage value that should be applied to the pump driving motor 25.

The PWM control unit 68 generates a drive signal on the basis of the control voltage value that is computed by the PI control unit 67 and the rotation angle θP of the pump driving motor 25, which is computed by the rotation angle computing unit 64, and supplies the drive signal to the drive circuit 43. In this way, a voltage corresponding to the control voltage value that is computed by the PI control unit 67 is applied from the drive circuit 43 to the pump driving motor 25. The pump rotation speed correcting unit 63 will be described in details. The pump rotation speed correcting unit 63 includes a valve opening degree command differential value computing unit 71, a pump rotation speed correction value computing unit 72, and a correction value adding unit 73.

The valve opening degree command differential value computing unit 71 computes a temporal differential value of the valve opening degree command value θB (hereinafter, referred to as "valve opening degree command differential value") that is set by the valve opening degree command value setting unit 52. The valve opening degree command differential value is obtained by, for example, subtracting the valve opening degree command value θB, which is set in the immediately preceding cycle, from the valve opening degree command value θB that is set in the current cycle by the valve opening degree command value setting unit 52. That is, the valve opening degree command differential value corresponds to an amount of change in the valve opening degree command value θB per unit time.

A direction in which the valve opening degree command value θB changes such that the absolute value of the valve opening degree command value θB increases (direction in which the rotation angular position of the rotor of the hydraulic control valve 14 move away from the neutral position) is defined as a valve opening direction. A direction in which the valve opening degree command value θB changes such that the absolute value of the valve opening degree command value θB decreases (direction in which the rotation angular position of the rotor of the hydraulic control valve 14 approaches the neutral position) is defined as a valve closing direction.

When the valve opening degree command value θB is changing in the valve opening direction, the valve opening degree command differential value computing unit 71 sets a positive sign to the absolute value of the computed valve opening degree command differential value and outputs the obtained value. On the other hand, when the valve opening degree command value θB is changing in the valve closing direction, the valve opening degree command differential value computing unit 71 sets a negative sign to the absolute value of the computed valve opening degree command differential value and outputs the obtained value.

The pump rotation speed correction value computing unit 72 computes a correction value of the pump rotation speed command value VP (hereinafter, referred to as "pump rotation speed correction value") on the basis of the valve opening degree command differential value that is computed by the valve opening degree command differential value computing unit 71. The correction value adding unit 73 adds the pump rotation speed correction value that is computed by the pump rotation speed correction value computing unit 72 to the pump rotation speed command value VP that is set by the pump rotation speed command value setting unit 62 to compute a final pump rotation speed command value VP1.

Figure 6:
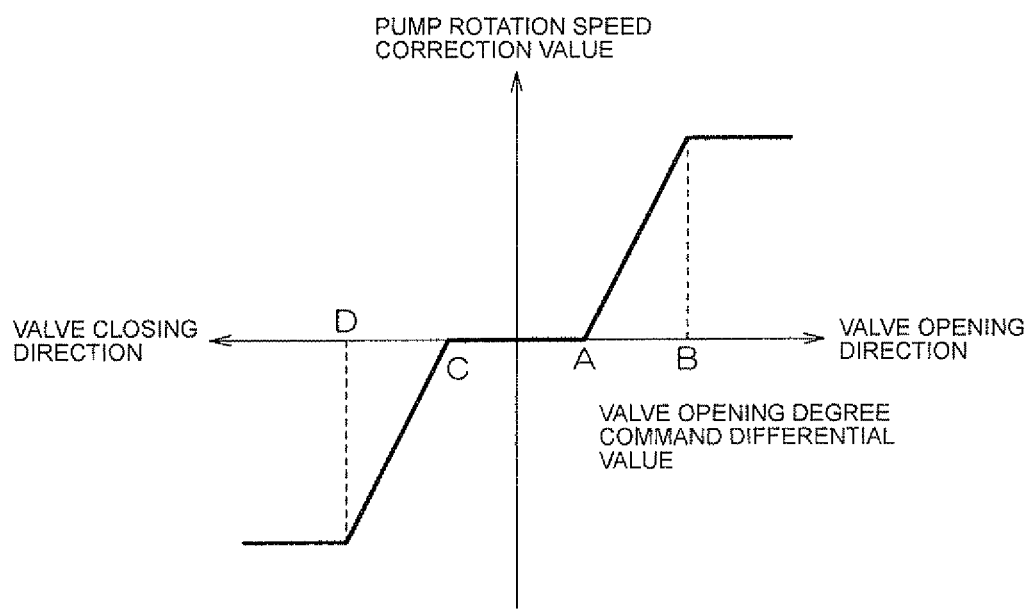
FIG. 6 is a graph that shows the relation of a pump rotation speed correction value with respect to a valve opening degree command differential value.

The pump rotation speed correction value computing unit 72 computes a pump rotation speed correction value on the basis of a map that stores the correlation between the valve opening degree command differential value and the pump rotation speed correction value. FIG. 6 is a graph that shows the relation of the pump rotation speed correction value with respect to the valve opening degree command differential value.

When the valve opening degree command value θB is changing in the valve opening direction, the pump rotation speed correction value is fixed at 0 in a range in which the valve opening degree command differential value (≥0) is smaller than a first predetermined value A. In addition, in a range in which the valve opening degree command differential value is larger than or equal to a second predetermined value B that is larger than the first predetermined value A, the pump rotation speed correction value is fixed at an upper limit value (>0). In a range in which the valve opening degree command differential value is larger than or equal to the first predetermined value A and smaller than the second predetermined value B, the pump rotation speed correction value is set to linearly increase from 0 to the upper limit value with an increase in the valve opening degree command differential value.

Thus, in the case where the valve opening degree command value θB is changing in the valve opening direction, when the valve opening degree command differential value becomes larger than or equal to the first predetermined value A, the pump rotation speed command value VP that is set by the pump rotation speed command value setting unit 62 is corrected so as to be increased by the pump rotation speed correcting unit 63.

On the other hand, when the valve opening degree command value θB is changing in the valve closing direction, the pump rotation speed correction value is fixed at 0 in a range in which the valve opening degree command differential value (<0) is larger than or equal to a third predetermined value C. In addition, in a range in which the valve opening degree command differential value is smaller than a fourth predetermined value D that is smaller than the third predetermined value C, the pump rotation speed correction value is fixed at a lower limit value (<0). In a range in which the valve opening degree command differential value is smaller than the third predetermined value C and larger than or equal to the fourth predetermined value D, the pump rotation speed correction value is set to linearly decrease from 0 to the lower limit value with a decrease in the valve opening degree command differential value.

Thus, in the case where the valve opening degree command value θB is changing in the valve closing direction, when the valve opening degree command differential value becomes smaller than the third predetermined value C, the pump rotation speed command value VP that is set by the pump rotation speed command value setting unit 62 is corrected so as to be decreased by the pump rotation speed correcting unit 63.

If the pump rotation speed command value VP that is set by the pump rotation speed command value setting unit 62 is directly transmitted to the rotation speed deviation computing unit 66 without being corrected by the pump rotation speed correcting unit 63, the following problem occurs. That is, in the case where the valve opening degree command value θB is changing in the valve opening direction, when an amount of change in the valve opening degree command value θB increases, the pressure of hydraulic fluid decreases. Then, a load of the pump driving motor 25 decreases, so the pump driving motor 25 attempts to increase its rotation speed. However, because the pump driving motor 25 is subjected to rotation speed feedback control, the rotation speed of the pump driving motor 25 does not increase. Therefore, the amount of hydraulic fluid that is supplied to the power cylinder 16 decreases.

On the other hand, in the case where the valve opening degree command value θB is changing in the valve closing direction, when an amount of change in the valve opening degree command value θB per unit time increases, the pressure of hydraulic fluid increases. Then, a load of the pump driving motor 25 increases, so the pump driving motor 25 attempts to decrease its rotation speed. However, because the pump driving motor 25 is subjected to rotation speed feedback control, the rotation speed of the pump driving motor 25 does not decrease. Therefore, the amount of hydraulic fluid that is supplied to the power cylinder 16 increases.

In the present embodiment, in the case where the valve opening degree command value θB is changing in the valve opening direction, when the valve opening degree command differential value becomes larger than or equal to the first predetermined value A, the pump rotation speed command value VP that is set by the pump rotation speed command value setting unit 62 is corrected so as to be increased by the pump rotation speed correcting unit 63. Therefore, in the case where the valve opening degree command value θB abruptly changes and hydraulic pressure decreases when the valve opening degree command value θB is changing in the valve opening direction, it is possible to increase the rotation speed of the pump driving motor 25. In this way, it is possible to suppress a decrease in the amount of hydraulic fluid that is supplied to the power cylinder 16.

In addition, in the present embodiment, in the case where the valve opening degree command value θB is changing in the valve closing direction, when the valve opening degree command differential value becomes smaller than the third predetermined value C, the pump rotation speed command value VP that is set by the pump rotation speed command value setting unit 62 is corrected so as to be decreased by the pump rotation speed correcting unit 63. Therefore, in the case where the valve opening degree command value θB abruptly changes and hydraulic pressure increases when the valve opening degree command value θB is changing in the valve closing direction, it is possible to decrease the rotation speed of the pump driving motor 25. In this way, it is possible to suppress an increase in the amount of hydraulic fluid that is supplied to the power cylinder 16.

The embodiment of the invention is described above; however, the invention may be implemented in various other embodiments. For example, in the above-described embodiment, in the case where the valve opening degree command value θB is changing in the valve closing direction, when the valve opening degree command differential value becomes smaller than the third predetermined value C, the pump rotation speed correcting unit 63 makes a correction such that the pump rotation speed command value VP that is set by the pump rotation speed command value setting unit 62 decreases. Alternatively, when the valve opening degree command value θB is changing in the valve closing direction, the pump rotation speed command value VP may not be corrected.

What is claimed is:

1. A hydraulic power steering system that assists a steering operation by supplying hydraulic fluid from a hydraulic pump to a power cylinder, which is coupled to a steering mechanism of a vehicle, via a hydraulic control valve that is not mechanically coupled to a steering member, comprising:
    a valve driving motor that is used to control an opening degree of the hydraulic control valve;
    a pump driving motor that is used to drive the hydraulic pump;
    opening degree command value setting means for setting an opening degree command value that is a command value of the opening degree of the hydraulic control valve;
    valve driving motor control means for controlling driving of the valve driving motor based on the opening degree command value that is set by the opening degree command value setting means;
    rotation speed command value setting means for setting a rotation speed command value that is a command value of a rotation speed of the hydraulic pump;
    rotation speed command value correcting means for correcting the rotation speed command value, which is set by the rotation speed command value setting means, based on an amount of change in the opening degree command value that is set by the opening degree command value setting means,
    wherein the rotation speed command value correcting means includes rotation speed command value increasing means for, when the opening degree command value that is set by the opening degree command value setting means changes so as to decrease a pressure of the hydraulic fluid, making a correction such that the rotation speed command value, which is set by the rotation speed command value setting means, increases based on the amount of change in the opening degree command value; and
    pump driving motor control means for controlling driving of the pump driving motor based on the rotation speed command value that has been corrected by the rotation speed command value correcting means.

2. The hydraulic power steering system according to claim 1, wherein the rotation speed command value correcting means includes rotation speed command value decreasing means for, when the opening degree command value that is set by the opening degree command value setting means changes so as to increase the pressure of the hydraulic fluid, making a correction such that the rotation speed command value, which is set by the rotation speed command value setting means, decreases based on the amount of change in the opening degree command value.

* * * * *